United States Patent
Sun et al.

(10) Patent No.: US 9,758,180 B2
(45) Date of Patent: Sep. 12, 2017

(54) SECURING SYSTEM FOR FREIGHT WAGON AND FREIGHT WAGON

(71) Applicant: CRRC QINGDAO SIFANG CO., LTD., Qingdao, Shandong (CN)

(72) Inventors: Zhaojin Sun, Shandong (CN); Xiaojun Deng, Shandong (CN); Shaoqing Liu, Shandong (CN); Jianqiang Guo, Shandong (CN); Peng She, Shandong (CN); Bingsong Wang, Shandong (CN); Yongxia Lan, Shandong (CN)

(73) Assignee: CRRC QINGDAO SIFANG CO., LTD., Qingdao, Shandong (CN)

( * ) Notice: Subject to any disclaimer, the term of this patent is extended or adjusted under 35 U.S.C. 154(b) by 0 days.

(21) Appl. No.: 15/119,353

(22) PCT Filed: Nov. 10, 2015

(86) PCT No.: PCT/CN2015/094189
§ 371 (c)(1),
(2) Date: Aug. 16, 2016

(87) PCT Pub. No.: WO2016/169245
PCT Pub. Date: Oct. 27, 2016

(65) Prior Publication Data
US 2017/0050649 A1 Feb. 23, 2017

(30) Foreign Application Priority Data

Apr. 20, 2015 (CN) .......................... 2015 1 0188846
Apr. 20, 2015 (CN) .......................... 2015 2 0240693

(51) Int. Cl.
*B60P 7/08* (2006.01)
*B61D 45/00* (2006.01)
(Continued)

(52) U.S. Cl.
CPC .......... *B61D 45/001* (2013.01); *B60P 7/0892* (2013.01); *B61D 3/00* (2013.01); *B61D 45/00* (2013.01); *B61D 49/00* (2013.01)

(58) Field of Classification Search
CPC ........ B61D 45/001; B61D 3/00; B61D 49/00; B60P 7/0892
(Continued)

(56) References Cited

U.S. PATENT DOCUMENTS 4,000,870 A * 1/1977 Davies .................. B64D 9/003
410/92
6,422,795 B2 7/2002 Holt
(Continued)

FOREIGN PATENT DOCUMENTS

CN 1817707 A 8/2006
CN 101450638 A 6/2009
(Continued)

OTHER PUBLICATIONS

International Search Report for PCT/CN2015/094189, dated Feb. 17, 2016, ISA/CN.

*Primary Examiner* — Stephen Gordon
(74) *Attorney, Agent, or Firm* — Yue Xu; U.S. Fairsky LLP

(57) ABSTRACT

A securing system for a freight wagon and a freight wagon are provided. The securing system includes an entrance area floor and non-entrance area floor in the freight wagon, multiple first rolling mechanisms and multiple turn position-limiting mechanisms are provided on the entrance area floor, multiple second rolling mechanisms, multiple turn position-limiting mechanisms, multiple lateral position-limiting mechanisms and multiple end position-limiting mechanisms are provided on the non-entrance area floor. With the technical solutions of the present application, loading, conveying and securing of cargo can be achieved in the shortest time on (Continued)

the basis of ensuring the safety and reliability of the transportation, and compared with the conventional cargo loading, the transport efficiency of the cargo is significantly increased and the cost is reduced efficiently.

18 Claims, 7 Drawing Sheets

(51) Int. Cl.
*B61D 3/00* (2006.01)
*B61D 49/00* (2006.01)

(58) Field of Classification Search
USPC ......... 410/69, 77, 78, 79, 80, 92; 244/118.1, 244/137.1; 105/355, 370, 392; 414/536
See application file for complete search history.

(56) References Cited

U.S. PATENT DOCUMENTS

| 2008/0089756 | A1* | 4/2008 | Allert | B64D 9/003 410/80 |
|---|---|---|---|---|
| 2009/0146445 | A1 | 6/2009 | Bernhardsson | |

FOREIGN PATENT DOCUMENTS

| CN | 201347073 Y | 11/2009 |
|---|---|---|
| CN | 203637841 U | 6/2014 |
| CN | 104802816 A | 7/2015 |
| CN | 204605819 U | 9/2015 |

\* cited by examiner

SECURING SYSTEM FOR FREIGHT WAGON AND FREIGHT WAGON

This application is the national phase of International Application No. PCT/CN2015/094189, titled "SECURING SYSTEM FOR FREIGHT WAGON AND FREIGHT WAGON", filed on Nov. 10, 2015, which claims the benefit of priorities to Chinese patent application No. 201510188846.7 titled "SECURING SYSTEM FOR FREIGHT WAGON AND FREIGHT WAGON", filed with the Chinese State Intellectual Property Office on Apr. 20, 2015, and Chinese patent application No. 201520240693.1 titled "SECURING SYSTEM FOR FREIGHT WAGON AND FREIGHT WAGON", filed with the Chinese State Intellectual Property Office on Apr. 20, 2015, the entire disclosures of which are incorporated herein by reference.

FIELD

The present application relates to the field of cargo transportation equipment, and particularly to a securing system for a freight wagon and a freight wagon.

BACKGROUND

In cargo transportation, in order to limit the position of objects such as cargos and secure the objects, a specialized securing device is generally required to be provided in a freight wagon.

A high-speed railway freight (using high-speed freight motor train unit) has competitive advantages of being faster than ordinary trains (the speed of the high-speed freight motor train unit ranges from 200 km/h to 350 km/h) and having a lower cost than air transportation. In the states represented by France and Germany, the high-speed railway freight has been developed starting from services such as delivering express mails and packages. At present, express freights in China mainly provide an express service for small parcels by carrying the small parcels in the high-speed railway passenger trains, which not only decreases logistic costs, but also provides convenience for owners of the parcels and is favored by many users. However, because of lacking specialized high-speed freight vehicles, it is difficult to achieve a large scale, batch and fast cargo transportation, which restricts the development of the railway fast freight business in China. Therefore, it is urgent to design and develop a modularized and unitized fast freight train.

A common manner for loading and securing cargos in a conventional railway freight (Luggage and Parcel Express Special Train) is described as follows. Cargos are loaded and unloaded by workers, parcels are loaded in bulk (on the floor of a cargo compartment) and are stacked in a joint-covering stacking type or a trapezoid stacking type, and instead of being secured, the stacked cargos are tightly pressed against each other. In order to secure cargos on the high-speed freight motor train unit, it is required to realize the quick loading and securing of the cargos, particularly the modularized and unitized cargos, to ensure the safety and reliability of the transportation. Thus, in order to meet the requirements of the freight, especially the high-speed railway freight, it is necessary to make improvements to address the above defects of the conventional technology.

SUMMARY

A main object of the present application is to provide a securing system for a freight wagon and a freight wagon. The securing system of the freight wagon has a simple structure, is convenient to operate, has a reliable effect, and can well meet the requirements of quick loading and securing of cargos.

To achieve the above objects, a securing system for a freight wagon is provided according to a first aspect of the present application. The securing system includes an entrance area floor and a non-entrance area floor which are located in the freight wagon. A plurality of first rolling mechanisms and a plurality of turn position-limiting mechanisms are provided on the entrance area floor, each of the first rolling mechanisms is configured to allow cargo to move on the entrance area floor in a transverse direction and a longitudinal direction of the freight wagon, each of the turn position-limiting mechanisms is switchable between a position-limiting state and a non-position-limiting state, and is configured to allow the cargo to pass thereabove in the non-position-limiting state, and limit a position of the cargo in the position-limiting state. A plurality of second rolling mechanisms, a plurality of the turn position-limiting mechanisms, a plurality of lateral position-limiting mechanisms and a plurality of end position-limiting mechanisms are provided on the non-entrance area floor, each of the second rolling mechanisms is configured to allow the cargo to move on the non-entrance area floor in the longitudinal direction of the freight wagon, each of the lateral position-limiting mechanisms is configured to limit the position of a lateral side of the cargo, and each of the end position-limiting mechanisms is configured to limit the position of an end of the cargo.

Further, the turn position-limiting mechanism includes a first base, a positioning member, and a position-limiting member rotatably arranged on the first base, the first base includes a hollow portion; in a case that the turn position-limiting mechanism is in the position-limiting state, the positioning member fixes a position of the position-limiting member, and in a case that the turn position-limiting mechanism is in the non-position-limiting state, the positioning member releases the position-limiting member, and at least a part of the position-limiting member is received in the hollow portion.

Further, the position-limiting member includes a main body portion and a position-limiting portion, the main body portion includes a first section and a second section, the first section has a first end rotatably arranged on the first base and a second end connected to a first end of the second section, a second end of the second section is connected to the position-limiting portion; the second section is a straight section, and the straight section and the position-limiting portion form a T-shaped structure.

Further, the turn position-limiting mechanism further includes a first elastic member, and the first elastic member is configured to allow the position-limiting member to have a tendency of turning toward the hollow portion.

Further, the positioning member includes a first positioning member, a first end of the first positioning member is rotatably arranged on the first base and a second end of the first positioning member is a hook-shaped structure, the first section has a hollow portion, the hook-shaped structure is configured to pass through the hollow portion and hook a first side of the first section in the case that the turn position-limiting mechanism is in the position-limiting state.

Further, the turn position-limiting mechanism further includes a second elastic member, and the second elastic member is configured to allow the second end of the first positioning member to have a tendency of moving upward with respect to the first base.

Further, the turn position-limiting mechanism further includes a pedal, the pedal is arranged on the first positioning member, and is configured to allow the second end of the first positioning member to move downward with respect to the first base under the action of an external force.

Further, the positioning member includes a second positioning member, a first end of the second positioning member is fixedly arranged on the first base, and a second end of the second positioning member is configured to abut against a second side of the first section in the case that the turn position-limiting mechanism is in the position-limiting state; and the first side and the second side are two opposite sides of the first section.

Further, the first rolling mechanism is a universal ball.

Further, the second rolling mechanism includes a second base and a pair of lugs arranged on the second base, and further includes a rolling member and a rotating shaft, the rolling member is supported on the pair of lugs by the rotating shaft, and is rotatable with respect to the second base, and an outer surface of the rolling member is in contact with an upper surface of the second base.

Further, the rolling member includes a roller shell and a bearing, the bearing is sleeved on the rotating shaft, and the roller shell covers an outer circumferential surface of the bearing.

Further, the lateral position-limiting mechanism includes a third base, a first lateral position-limiting stop and a first vertical position-limiting stop, the first lateral position-limiting stop is arranged on the third base and extends upward in a vertical direction, the first vertical position-limiting stop is arranged on an end, away from the third base, of the first lateral position-limiting stop and extends in a horizontal direction; a junction, where the first lateral position-limiting stop and the first vertical position-limiting stop are connected, forms a first right-angled lock; and an upper surface of the third base, the first lateral position-limiting stop and the first vertical position-limiting stop together form a position-limiting securing area for limiting the position of the cargo.

Further, the third base includes a front mounting platform and a rear mounting platform, and the first lateral position-limiting stop is arranged at a junction where the front mounting platform and the rear mounting platform are connected.

Further, the lateral position-limiting mechanism further includes a reinforcing plate, the reinforcing plate has one end connected to the rear mounting platform and another end connected to the junction of the first lateral position-limiting stop and the first vertical position-limiting stop.

Further, the end position-limiting mechanism is a position-limiting securing device with a rolling auxiliary conveying mechanism, the position-limiting securing device includes a fourth base, a second longitudinal position-limiting stop and a second vertical position-limiting stop, the second longitudinal position-limiting stop is arranged on the fourth base and extends upward in a vertical direction, the second vertical position-limiting stop is arranged on an end, away from the fourth base, of the second longitudinal position-limiting stop and extends in a horizontal direction, a junction, where the second longitudinal position-limiting stop and the second vertical position-limiting stop are connected, forms a second right-angled lock; and the rolling auxiliary conveying mechanism is arranged on an upper surface of the fourth base and is configured to guide the cargo into the second right-angled lock.

Further, the rolling auxiliary conveying mechanism includes a roller and a pair of lugs, the roller is rotatably arranged between the pair of lugs, and a central axis of the roller is in parallel with the second longitudinal position-limiting stop.

Further, the rolling auxiliary conveying mechanism further includes a rolling shaft, the rolling shaft passes through the central axis of the roller and the pair of lugs, and an outer surface of the roller is in contact with the upper surface of the fourth base.

Further, the rolling member includes a roller shell and a bearing, the bearing is sleeved on the rolling shaft, and the roller shell covers an outer circumferential surface of the bearing.

According to a second aspect of the present application, a freight wagon is provided, the freight wagon has the securing system for the freight wagon according to any one of the solutions in the first aspect.

With the technical solutions of the present application, multiple first rolling mechanisms and multiple turn position-limiting mechanisms are provided on the entrance area floor, multiple second rolling mechanisms, multiple turn position-limiting mechanisms, multiple lateral position-limiting mechanisms and multiple end position-limiting mechanisms are provided on the non-entrance area floor, loading, conveying and securing of the cargo can be achieved in a shortest time on the basis of ensuring the safety and reliability of the transportation, and compared with the conventional cargo loading, the transport efficiency of the cargo is significantly increased and the cost is reduced efficiently.

BRIEF DESCRIPTION OF THE DRAWINGS

Drawings of the specification constituting a part of the present application are used to help further understanding of the present application, and exemplary embodiments of the present application and explanations thereof are used to interpret the present application, and do not constitute inappropriate limitations to the present application. In the drawings.

DETAILED DESCRIPTION

It is to be noted that, embodiments of the present application and features in the embodiments can be combined with each other without causing conflicts. The present application will be described in detail hereinafter with reference to the drawings and the embodiments.

In order to address the issues in the conventional technology, a securing system for a freight wagon is provided according to the present application. The securing system includes an entrance area floor and a non-entrance area floor in the freight wagon. Multiple first rolling mechanisms and multiple turn position-limiting mechanisms are provided on the entrance area floor. The first rolling mechanism is configured to allow cargo to move on the entrance area floor in a transverse direction and a longitudinal direction of the freight wagon. The turn position-limiting mechanism is switchable between a position-limiting state and a non-position-limiting state, and is configured to allow the cargo to pass thereabove in the non-position-limiting state, and is configured to limit the position of the cargo in the position-limiting state. Multiple second rolling mechanisms, multiple turn position-limiting mechanisms, multiple lateral position-limiting mechanisms and multiple end position-limiting mechanisms are provided on the non-entrance area floor. The second rolling mechanisms is configured to allow the cargo to move on the non-entrance area floor in the longitudinal direction of the freight wagon, The lateral position-limiting mechanism is configured to limit the position of a lateral side of the cargo, and the end position-limiting mechanism is configured to limit the position of an end of the cargo.

According to the technical solution of the present application, the multiple first rolling mechanisms and the multiple turn position-limiting mechanisms are provided on the entrance area floor, and the multiple second rolling mechanisms, the multiple turn position-limiting mechanisms, the multiple lateral position-limiting mechanisms and the multiple end position-limiting mechanisms are provided on the non-entrance area floor, thus, the loading, conveying and securing of the cargos may be achieved in the shortest time on the basis of ensuring the safety and reliability of the transportation, and compared with the conventional cargo loading, the technical solution of the present application may considerably improve the transport efficiency of cargos and effectively reduce the cost.

Figure 1:
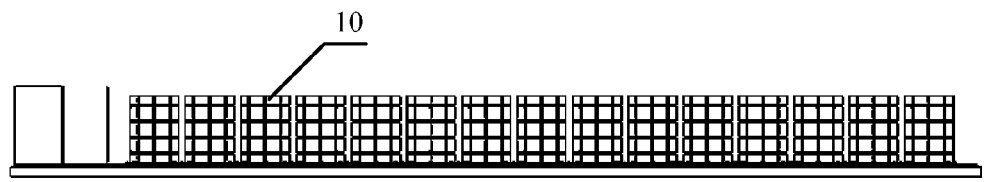
FIG. 1 shows a front view of a freight wagon according to an embodiment of the present application.
Figure 2:
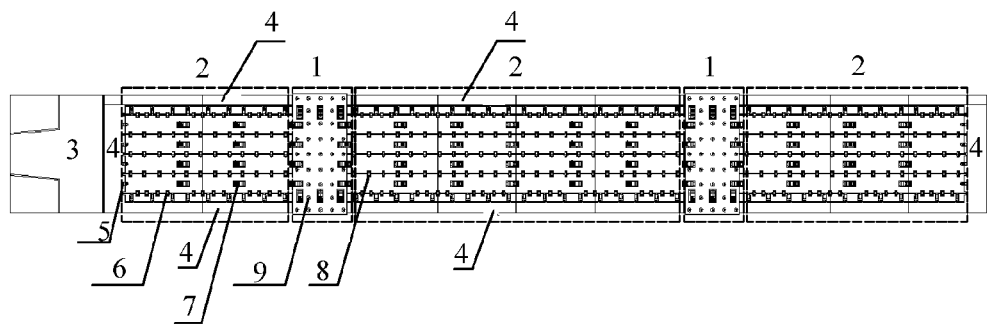
FIG. 2 shows a top view of the freight wagon according to the embodiment of the present application.
Figure 3:
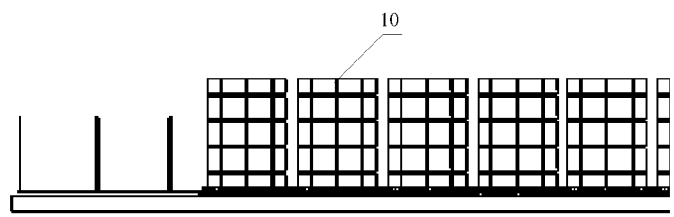
FIG. 3 is a partial view of FIG. 1.
Figure 4:
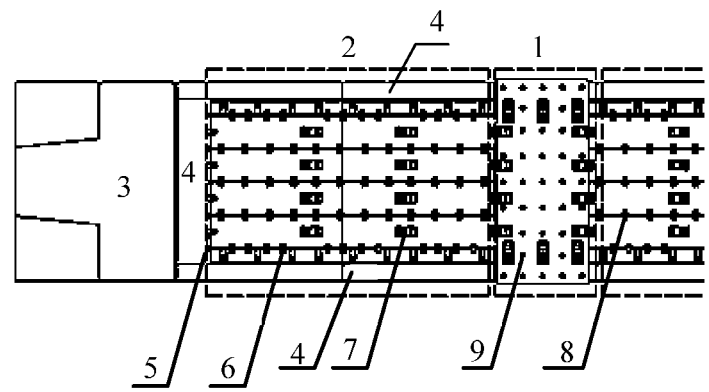
FIG. 4 is a partial view of FIG. 2.
Figure 5:
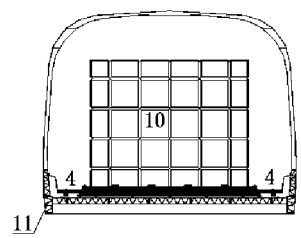
FIG. 5 shows a rear view of the freight wagon according to the embodiment of the present application.

FIG. 1 shows a front view of a freight wagon according to an embodiment of the present application. FIG. 2 shows a top view of the freight wagon according to the embodiment of the present application. FIG. 3 is a partial view of FIG. 1. FIG. 4 is a partial view of FIG. 2. FIG. 5 shows a rear view of the freight wagon according to the embodiment of the present application.

As shown in FIGS. 1 to 5, in the freight wagon according to this embodiment, a securing system includes an entrance area floor 1 and a non-entrance area floor 2. The entrance area floor 1 refers to a part of the floor of the freight wagon that corresponds to an entrance of the freight wagon. As shown in FIGS. 2 and 4, an upper side and a lower side of the entrance area floor 1 in the dashed box just correspond to the entrance of the freight wagon. The entrance may be provided on either one of the upper side and the lower side shown in FIGS. 2 and 4, or may be provided on each of the two sides. Correspondingly, the non-entrance area floor 2 refers to the rest part, for placing cargos, of the floor of the freight wagon other than the entrance area floor 1, and is shown in the corresponding dashed boxes in FIGS. 2 and 4.

Reference is made to FIGS. 2 and 4, the freight wagon may further include an equipment room floor 3 and a staff passage 4. The staff passage 4 may be provided at ends of the non-entrance area floor 2 in the longitudinal direction of the freight wagon, and lateral sides of the non-entrance area floor 2 in the transverse direction of the freight wagon, to facilitate the staff inspecting the securing and position-limiting condition of cargos 10 in this area.

Figure 6:
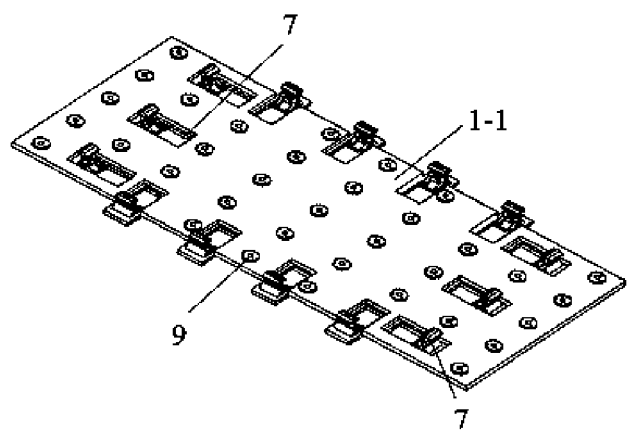
FIG. 6 shows a schematic view of the structure of an entrance area floor according to the embodiment of the present application.

As shown in FIG. 6, the entrance area floor 1 includes a first bearing floor 1-1, multiple turn position-limiting mechanisms 7, and multiple first rolling mechanisms 9. The first rolling mechanism 9 is configured to allow the cargo 10 to move on the entrance area floor 1 in the transverse direction and the longitudinal direction of the freight wagon. The turn position-limiting mechanism 7 is switchable between a position-limiting state and a non-position-limiting state, and is configured to allow the cargo 10 to pass thereabove in the non-position-limiting state, and limit the position of the cargo 10 in the position-limiting state. The first rolling mechanism 9 may be embodied as a universal ball, to allow the first rolling mechanism 9 to roll in the transverse direction and the longitudinal direction.

Figure 7:
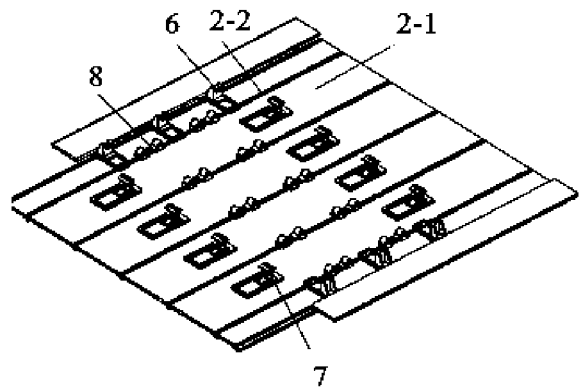
FIG. 7 shows a partially schematic view of partial structure of a non-entrance area floor according to the embodiment of the present application.

As shown in FIGS. 4 and 7, the non-entrance area floor 2 includes a second bearing floor 2-1, a ball track 2-2, multiple end position-limiting mechanisms 5, multiple lateral position-limiting mechanisms 6 and multiple second rolling mechanisms 8. The second rolling mechanism 8 is configured to allow the cargo 10 to move on the non-entrance area floor 2 in the longitudinal direction of the freight wagon. The end position-limiting mechanism 5 is configured to limit the position of an end of the cargo 10. The lateral position-limiting mechanism 6 is configured to limit the position of a lateral side of the cargo 10.

In this embodiment, the transverse direction of the freight wagon refers to an up-down direction as shown in FIG. 2, and the longitudinal direction of the freight wagon refers to a left-right direction as shown in FIG. 2, i.e., a forward direction of a vehicle body 11 as shown in FIG. 5.

Figure 8:
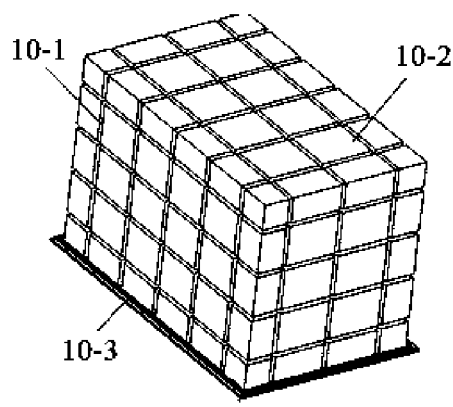
FIG. 8 shows a schematic view of the structure of a pallet according to an embodiment of the present application.

In addition, as shown in FIG. 8, cargos may be loaded in a modularized manner by a pallet 10-3. Bulk cargos 10-2 may be packed by a string bag 10-1, and then may be secured on the pallet 10-3, e.g., by binding, to form a modularized cargo 10, thereby facilitating a quick loading and unloading and securing of the cargos. Apparently, cargos may also be loaded in a container or in other modularized manners.

Next, specific structures of the turn position-limiting mechanism, the second rolling mechanism, the lateral position-limiting mechanism and the end position-limiting mechanism are described respectively with reference to FIGS. 9 to 16. It should be noted that, in the following embodiments of the respective mechanisms, reference numerals used in each embodiment only represent constituting parts involved in that particular embodiment. However, since individual embodiments refer to different mechanisms, all embodiments or part of the embodiments of the mechanisms may be combined together.

Figure 9:
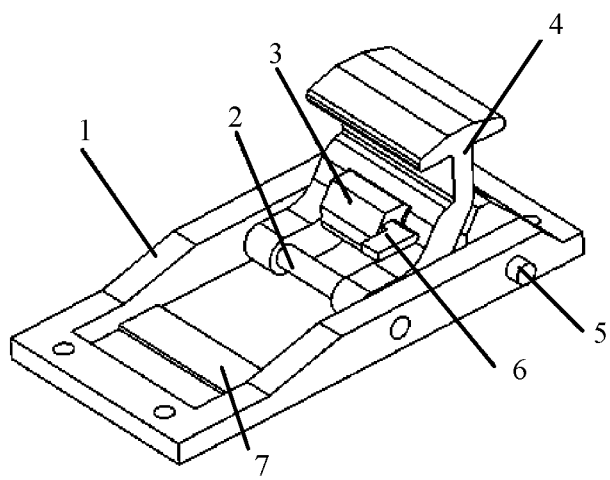
FIG. 9 shows a schematic view of the structure of a turn position-limiting mechanism according to an embodiment of the present application.
Figure 10:
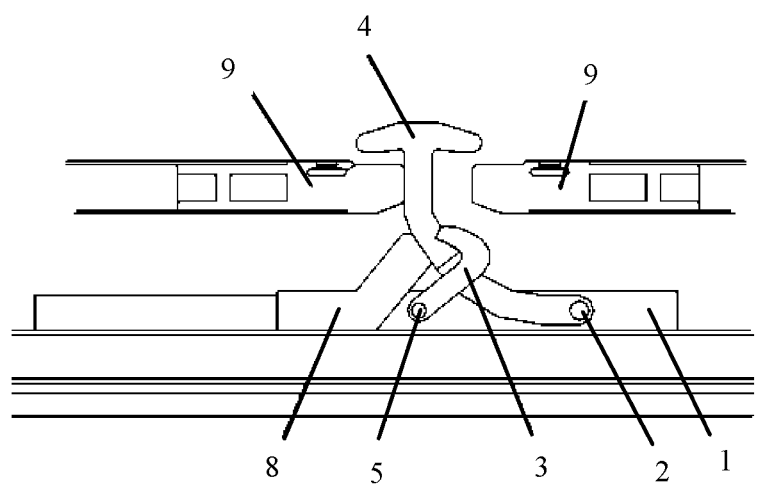
FIG. 10 shows a schematic view of the structure of the turn position-limiting mechanism in use according to the embodiment of the present application.

FIG. 9 shows a schematic view of the structure of a turn position-limiting mechanism according to an embodiment of the present application. FIG. 10 shows a schematic view of the structure of the turn position-limiting mechanism in use according to the embodiment of the present application, and shows a part of a position-limiting member 4 in a sectional view to present the structure of a first positioning member 3.

As shown in FIG. 9, in an embodiment of the present application, the position-limiting device includes a first base 1 and a position-limiting member 4 rotatably arranged on the first base 1. The first base 1 includes a hollow portion. For example, the first base 1 may be a square frame structure, and the square frame structure is formed by side plates on a left side and a right side and end plates on a front end and a rear end of the frame structure, and a central part of the frame structure is the hollow portion.

It should be noted that, in FIG. 9, the front-rear direction refers to a forward-backward direction (i.e., a left-right direction in FIG. 10) during the cargo conveying process, and the left-right direction is defined by taken the forward direction (i.e., the leftward direction in FIG. 10) during the cargo conveying process as a reference.

Also, the position-limiting device may further include a positioning member. Since the position-limiting member 4 is rotatably arranged on the first base 1, the position-limiting member 4 is configured to be switchable between a position-limiting state and a non-position-limiting state. When the position-limiting member 4 is in the position-limiting state, the positioning member fixes the position of the position-limiting member 4, to keep the position-limiting member 4 in the position-limiting state. When the position-limiting member 4 is in the non-position-limiting state, the positioning member releases the position-limiting member 4, and at least a part of the position-limiting member 4 is received in the hollow portion.

Further, the position-limiting member 4 may include a main body portion and a position-limiting portion. The main body portion includes a first section and a second section connected to each other. The first section has a first end rotatably arranged on the first base 1 and a second end connected to a first end of the second section, and a second end of the second section is connected to the position-limiting portion.

The second section and the position-limiting portion form a position-limiting area. Thus, the position-limiting area may limit at least a part of the cargo or at least a part of a carrier for the cargo (e.g., a container or a pallet) in the position-limiting area, thereby achieving its position-limiting function. Preferably, at least a part of a junction, where the second section and the position-limiting portion are connected, can form a right-angled position-limiting area, thereby facilitating exerting the position-limiting effect of the position-limiting area.

The second section may be a straight section. The straight section and the position-limiting portion may constitute a T-shaped structure. Thereby, a junction, where the second section and the position-limiting portion are connected, forms two right-angled position-limiting areas, thereby effectively limiting the positions of objects at the front side and the rear side at the same time.

The position-limiting device may further include a first elastic member, and the first elastic member is configured to allow the position-limiting member 4 to have a tendency of being switched from the position-limiting state to the non-position-limiting state. Thereby, under the action of an elastic force of the first elastic member, the position-limiting member 4 always has a tendency of turning from an upright position-limiting state to a flat non-position-limiting state. Once the position-limiting member 4 is released by the positioning member, the position-limiting member 4 may automatically turn to the non-position-limiting state.

Referring to FIG. 9, the first end of the first section of the main body portion of the position-limiting member 4 may be rotatably arranged on the first base 1 by a first rotating shaft 2. The first elastic member may be a first torsional spring sleeved on the first rotating shaft 2. Apparently, besides the first torsional spring, the first elastic member may be embodied as other forms of springs, for example, a tension spring having one end connected to the first base 1 and another end connected to the position-limiting member 4, and the first elastic member may also be embodied as other forms of components and/or mechanisms having elastic members.

As shown in FIGS. 9 and 2, the positioning member may include a first positioning member 3. A first end of the first positioning member 3 is rotatably arranged on the first base 1, and a second end of the first positioning member 3 is a hook-shaped structure. The first section of the main body portion of the position-limiting member 4 has a hollow portion, and the hook-shaped structure is configured to pass through the hollow portion and hook a first side of the first section in the case that the position-limiting member 4 is in the position-limiting state.

Thereby, when the position-limiting member 4 is in the upright position-limiting state, the second end of the first positioning member 3 passes through the hollow portion in the first section of the main body portion of the position-limiting member 4, and the hook-shaped structure of the second end of the first positioning member 3 hooks the first side (i.e., a right side shown in FIG. 10) of the first section, thereby positioning the position-limiting member 4 in the position-limiting state. When the position-limiting member 4 is required to turn from the upright position-limiting state to the flat non-position-limiting state, firstly the hook-shaped structure needs to be disengaged from the first side of the first section and withdrew from the hollow portion, to allow the first positioning member 3 to release the position-limiting member 4, thus the position-limiting member 4 can smoothly turn to the non-position-limiting state.

The position-limiting device may further include a second elastic member, and the second elastic member is configured to allow the second end of the first positioning member 3 to have a tendency of moving upward with respect to the first base 1. Thereby, under the action of an elastic force of the second elastic member, the second end of the first positioning member 3 always has a tendency of moving upward with respect to the first base 1. Once the second end of the first positioning member 3 cooperates with the first section of the position-limiting member 4, the first positioning member 3 can reliably fix the position of the position-limiting member 4 with the elastic force of the second elastic member.

Reference is made to FIG. 10, the first end of the first positioning member 3 is rotatably arranged on the first base 1 via a second rotating shaft 5, and the second elastic member is a second torsional spring sleeved on the second rotating shaft 5. Apparently, in addition to the second torsional spring, the second elastic member may also be embodied as other forms of springs, for example a spring having one end connected to the first base 1 and another end connected to the first positioning member 3, and the second elastic member may also be embodied as other forms of components and/or mechanisms having elastic members.

Furthermore, as shown in FIG. 9, the position-limiting device may further include a pedal 6. The pedal 6 is arranged on the first positioning member 3 and is configured to allow the second end of the first positioning member 3 to move downward with respect to the first base 1 under the action of an external force. For example, when the pedal 6 is stepped by an operator, the second end of the first positioning member 3 moves downward with respect to the first base 1, and meanwhile the position-limiting member 4 turns to the non-position-limiting state, thereby allowing the first positioning member 3 to release the position-limiting member 4.

As shown in FIG. 10, the positioning member may further include a second positioning member 8. The second positioning member 8 has a first end fixedly arranged on the first base 1 and a second end configured to abut against a second side of the first section in the case that the position-limiting member 4 is in the position-limiting state. The first side and the second side are respectively two opposite sides of the first section, i.e., a left side and a right side of the first section of the main body portion of the position-limiting member 4 in FIG. 10.

Preferably, as shown in FIGS. 9 and 2, the first section of the main body portion of position-limiting member 4 may be an arc-shaped section. With this structure, in the case that the second positioning member 8 is provided, the second positioning member 8 in the position-limiting state may abut against the second side of the arc-shaped section, that is, abuts against an arc-shaped surface, thereby increasing the stability of the positioning. Furthermore, by configuring the first section as the arc-shaped section, the height of the entire position-limiting device in the case that the position-limiting member 4 is in the flat non-position-limiting state can be reduced as far as possible, thus facilitating cargos or a carrier for the cargos (e.g., a container or a pallet) to pass above the position-limiting device.

In order to increase the structural strength of the first base 1, as shown in FIG. 9, a reinforcing plate 7 may be provided in the hollow portion of the first base 1. The number of the reinforcing plate may be one or more and may be determined according to practical requirements.

The first base 1 may be provided with a fixing mechanism for fixing the first base 1. The fixing mechanism may include a mounting countersink and a bolt hole provided in the mounting countersink. The mounting countersink may ensure that a bolt mounted in the bolt hole will not be higher than an upper surface of the first base 1, to avoid an interference with an object supported on the first base 1.

FIG. 10 shows a schematic view of the structure of the position-limiting device in use according to the embodiment of the present application. As shown in FIG. 10, when the position-limiting member 4 of the position-limiting device is in the position-limiting state, the position-limiting member 4 can limit the positions of two pallets 9 (on which containers or other cargos may be placed) at the same time, in this case, a right end of the pallet 9 at the left and a left end of the pallet 9 at the right respectively enter into two position-limiting areas of the T-shaped structure described hereinabove, thereby limiting the positions of the pallets 9.

Reference is made to FIGS. 9 and 10, when the two pallets 9 are moved away, and the position-limiting member 4 of the position-limiting device is required to be switched to the non-position-limiting state, an operator may step on the pedal 6 to overcome the elastic force of the second elastic member, to allow the second end of the first positioning member 3 to move downward, and meanwhile, the position-limiting member 4 turns to the non-position-limiting state under the action of the first elastic member or a manual force, thus, the position-limiting member 4 is released by the first positioning member 3, and then the position-limiting member 4 continues to turn until at least a part of the position-limiting member 4 is received in the hollow portion of the first base 1.

Figure 11:
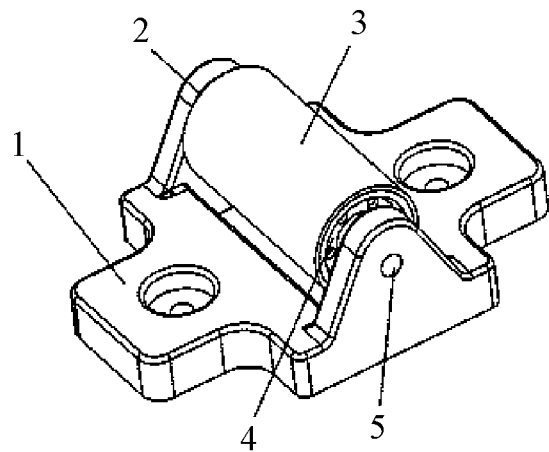
FIG. 11 shows a schematic view of the structure of a second rolling mechanism according to an embodiment of the present application.
Figure 12:
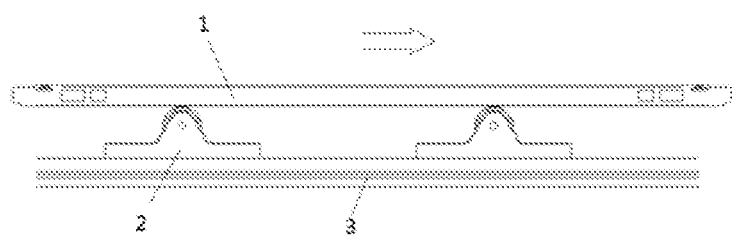
FIG. 12 shows a schematic view of the structure of the second rolling mechanism in use according to the embodiment of the present application.

FIG. 11 shows a schematic view of the structure of a second rolling mechanism according to an embodiment of the present application. FIG. 12 shows a schematic view of the structure of the second rolling mechanism in use according to the embodiment of the present application.

As shown in FIG. 11, in an embodiment of the present application, a rolling conveying structure is provided, which includes a second base 1 and a pair of lugs arranged on the second base 1. The pair of lugs are respectively provided on two sides of the second base 1. The pair of lugs may be formed integrally with the second base 1, and may also be formed separately, for example, the pair of lugs are connected to the second base 1 by welding.

Referring to FIG. 11, the rolling conveying structure further includes a rolling member and a rotating shaft 5. The rolling member is supported on the pair of lugs by the rotating shaft 5, and the rolling member is rotatable with respect to the second base 1. An outer surface of the rolling member and an upper surface of the second base 1 are in contact with each other. When the rolling member is rolling, a certain friction is generated between the outer surface of the rolling member and the upper surface of the second base 1.

Thereby, the pair of lugs functions to support the rotating shaft 5 and the rolling member. When the rolling member rotates about the rotating shaft 5 with respect to the second base 1, the outer surface of the rolling member is in contact with the upper surface of the second base 1, and a pressure exerted downwardly on the rolling member in a vertical direction may be transferred to the second base 1 by this contact.

With the above structure, in one aspect, the outer surface of the rolling member is in contact with the upper surface of the second base 1, which prevents the rotating shaft 5 from subjecting all the pressure applied on the rolling member, thus the rotating shaft 5 is not apt to fracture, and the safety and the stability of the rolling conveying structure are increased; in another aspect, the pressure exerted downwardly on the rolling member in the vertical direction may be transferred to the second base 1 by this contact, and the pressure is also borne by the second base 1, thereby, the bearing capacity of the entire rolling conveying structure is improved.

The rolling member may include a roller shell 3 and a bearing 4. The bearing 4 is sleeved on the rotating shaft 5, that is, an inner race of the bearing 4 is closely sleeved on the rotating shaft 5 and an outer race of the bearing 4 is rotatable with respect to the inner race thereof and the rotating shaft 5. The roller shell 3 covers an outer circumferential surface of the bearing 4, that is, the roller shell 3 covers an outer circumferential surface of the outer race of the bearing 4 and forms a protective layer of the outer circumferential surface of the bearing 4. The rolling member may also be in other various forms, for example, the rolling member may be an independent roller or an independent bearing.

The bearing 4 is preferably embodied as a friction bearing. The friction bearing is a solid lubrication bearing, solid lubrication refers to a lubrication method in which solid powders, films or an integral material are utilized to reduce friction or abrasion. Common solid lubrication materials include molybdenum disulfide, graphite, graphite fluoride, or soft metals such as tin, lead and magnesium. The solid lubrication material has a better chemical stability than grease lubricant, and will not be deteriorated when being radiated, and has a small outgassing amount in a vacuum condition. The lubrication system of the friction bearing is simple, and may not cause pollution to other adjacent components. In the lubricating process, the solid lubrication material interacts with the friction surface to form a solid lubrication film, and the lubrication is reliable, rotation is flexible, a friction moment is small and uniform, and a certain load can be borne. In terms of the structure, it mainly facilitates decreasing the friction and reducing the abrasion. The friction bearing may be applied to a conveying roller table of a rolling mill, a trolley driving wheel of a sintering machine, the field of aerospace, and etc.

Since the outer surface of the rolling member and the upper surface of the second base 1 are in contact with each other, when the rolling member is rotating, a certain friction may be generated between the outer surface of the rolling member and the upper surface of the second base 1. In the case that the rolling member includes the roller shell 3 and the bearing 4, the bearing 4 is embodied as a friction bearing, which may further increase the bearing capability of the bearing 4 itself and reduce the friction of the bearing 4 itself when rolling, thereby facilitating improving the bearing capability of the entire rolling conveying structure and facilitating decreasing the friction loss in the operating process of the entire rolling conveying structure.

The rolling member may further include end closure plates 2. The end closure plates 2 are arranged at end openings of two ends of the roller shell 3, and are configured to close the end openings of the two ends of the roller shell 3.

Thus, the end openings of the two ends of the roller shell 3 are closed respectively by the end closure plates 2, which may not only avoid damage to the bearing 4 caused by foreign matters entering into the interior of the bearing 4, but also avoid leakage or contamination and deterioration of the lubricant in the case that the bearing 4 is filled with lubricant.

Preferably, the end closure plates 2 are detachably arranged at the end openings of the roller shell 3 respectively, thereby facilitating the repair and maintenance of the inner structure, being covered by the roller shell 3, of the bearing 4, and also facilitating refilling or replacing the lubricant in the bearing 4. The end closure plates may also be fixedly arranged at the end openings of the roller shell 3 respectively, to improve the stability of connection between the end closure plates 2 and the end openings respectively and ensure the structural strength and sealing property.

The components described above may be formed integrally by welding or precision casting, thus, on the premise of ensuring the strength requirements of the rolling conveying structure, the weight of the entire rolling conveying structure is reduced, and requirements of light weight and energy saving are also met. The rolling member is a rotating component with optimized strength and is embodied as a light weight structure to reduce the weight.

Reference is made to FIG. 11, the second base 1 may be a cross-shaped plate-type structure, which not only meets the dimensional requirements for arranging the rolling member, but also reduces the material usage and space occupation as far as possible. Apparently, the second base may also be embodied as a rectangular plate-type structure to facilitate mass production and rapid layout.

A securing mechanism for securing the second base is provided on the second base. For example, the securing mechanism may include a mounting countersink and a bolt hole arranged in the mounting countersink.

Thereby, by forming the bolt hole in the mounting countersink, when the second base is mounted on, for example, the floor by using a bolt, a head portion of the bolt may be located in a recessed space formed by the mounting countersink and may not project from an upper surface of the second base, to avoid exposure of the head of the bolt and reduce the possibility of an occurrence of interference. The securing mechanism may also be other common forms, for example, a screw connection structure or a welding structure and etc.

FIG. 12 shows a schematic view of the structure of the rolling conveying structure in use according to the embodiment of the present application. As shown in FIG. 12, by securing the second base 1 on the floor 6, the entire rolling conveying structure is arranged on the floor 6. Cargos are supported on the pallet 7. By placing the pallet 7 on multiple rolling conveying structures arranged on the floor 6 and moving the pallet 7 along the direction indicated by an arrow in FIG. 12, the pallet 7 is supported by the rolling conveying structure and is moved forward by rolling of the rolling conveying structure, to arrive at a predetermined position on the floor 6 conveniently and effortlessly.

Thereby, the rolling conveying structure arranged on the floor may be operated manually (for example, by one operator or two operators), to utilize a friction force generated between a rolling member and a bottom surface of the cargo unitized unit (or the cargo), and to allow the rolling member to cooperate with other track devices arranged in the vehicle, thereby conveniently pushing the cargo unitized unit (for example, a pallet) to a designated position by rolling of the roller. The cargo unitized unit can be conveyed rapidly, conveniently and effortlessly in the loading process and unloading process.

Figure 13:
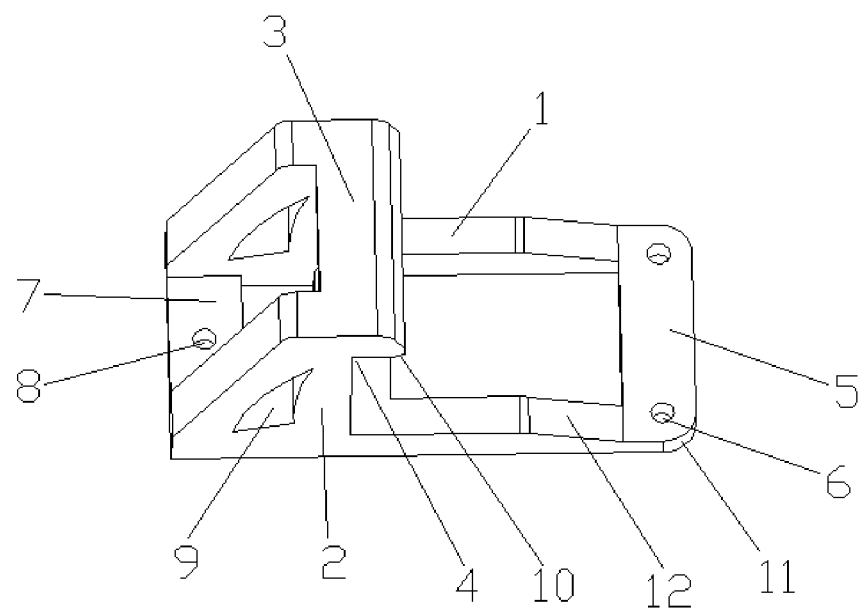
FIG. 13 shows a schematic view of the structure of a lateral position-limiting mechanism according to an embodiment of the present application.
Figure 14:
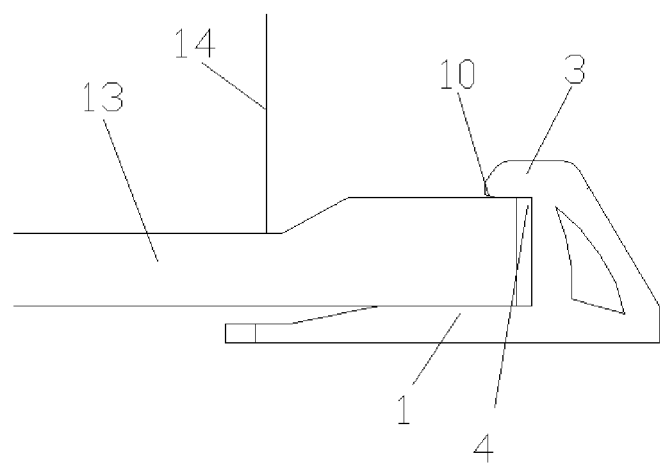
FIG. 14 shows a schematic view of the structure of the lateral position-limiting mechanism in use according to the embodiment of the present application.

FIG. 13 shows a schematic view of the structure of a lateral position-limiting mechanism according to an embodiment of the present application, and FIG. 14 shows a schematic view of the structure of the lateral position-limiting mechanism in use according to the embodiment of the present application.

As shown in FIG. 13, in an embodiment of the present application, the position-limiting securing device includes a third base 1, a first lateral position-limiting stop 2 and a first vertical position-limiting stop 3. The first lateral position-limiting stop 2 is arranged on the third base 1 and extends upward in a vertical direction. The first vertical position-limiting stop 3 is arranged on an end, away from the third base 1, of the first lateral position-limiting stop 2, and extends in a horizontal direction.

Reference is made to FIG. 13, in other words, a lower end of the first lateral position-limiting stop 2 is arranged on the third base 1, an upper end of the first lateral position-limiting stop 2 is connected to a left end of the first vertical position-limiting stop 3, and a right end of the first vertical position-limiting stop 3 extends rightward in the horizontal direction. Each of the first lateral position-limiting stop 2 and the first vertical position-limiting stop 3 may be embodied as a plate-type structure.

The third base 1, the first lateral position-limiting stop 2 and the first vertical position-limiting stop 3 may be formed integrally, for example by casting. The third base 1, the first lateral position-limiting stop 2 and the first vertical position-limiting stop 3 may also be formed separately, and then connected to each other, for example by welding.

Also, a junction, where the first lateral position-limiting stop 2 and the first vertical position-limiting stop 3 are connected, forms a first right-angled lock 4. That is, in FIG. 13, a right side surface of the first lateral position-limiting stop 2 is perpendicularly connected to a lower surface of the first vertical position-limiting stop 3. The junction of the right side surface of the first lateral position-limiting stop 2 and the lower surface of the first vertical position-limiting stop 3 forms the first right-angled lock 4. Thereby, an upper surface of the third base 1, the first lateral position-limiting stop 2 and the first vertical position-limiting stop 3 together form a position-limiting securing area, and the position-limiting securing area may be configured to limit and secure an object, for example, to clamp and secure at least a part of the object or at least a part of a carrier of the object.

As shown in FIG. 13, the third base 1 may include a front mounting platform 5 and a rear mounting platform 7. The first lateral position-limiting stop 2 is arranged at a junction of the front mounting platform 5 and the rear mounting platform 7. The right end of the first vertical position-limiting stop 3 extends rightward in the horizontal direction, that is, the right end of the first vertical position-limiting stop 3 extends transversely in parallel with an upper surface of the front mounting platform 5.

Preferably, the position-limiting securing device may further include a reinforcing plate. One end of the reinforcing plate is connected to the rear mounting platform 7, for example at a leftmost end of the rear mounting platform 7. Another end of the reinforcing plate is connected to the junction of the first lateral position-limiting stop 2 and the first vertical position-limiting stop 3. Thereby, by arranging the reinforcing plate, the strength and bearing capability of the first lateral position-limiting stop 2 may be further increased, which allows the entire position-limiting securing device to be safer and more reliable.

Preferably, two of the reinforcing plates are provided, and are respectively located on two ends of the junction of the first lateral position-limiting stop 2 and the first vertical position-limiting stop 3, that is, two ends, in a longitudinal direction, of the junction of the position-limiting stop 2 and the first vertical position-limiting stop 3 in FIG. 13. With this structure, on the premise of ensuring the strength and bearing capability of the first lateral position-limiting stop 2, the weight of the entire position-limiting securing device is reduced, thereby meeting requirements of light weight and energy saving.

As shown in FIG. 13, at the lower end, in the longitudinal direction, of the first lateral position-limiting stop 2, a strength optimizing and decorative hole 9 is formed between the reinforcing plate and the first lateral position-limiting stop 2. Thereby, a triangular structure is formed by the reinforcing plate, the third base 1 and the first lateral position-limiting stop 2, which not only facilities increasing the strength of the entire device and but also facilities further reducing the weight of the entire device.

To facilitate guiding an object to be limited and secured into the position-limiting securing area described hereinabove, the lower surface of the first vertical position-limiting stop 3 is provided with a guiding oblique plane 10. Furthermore, the upper surface of the front mounting platform 5 may also be provided with a third-base guiding oblique plane 12. Thereby, when the object moves from a right side to a left side in FIG. 13, due to the presence of the guiding oblique plane 10 and the third-base guiding oblique plane 12, a frontmost end, in a moving direction, of the object can easily enter into the position-limiting securing area. Preferably, the guiding oblique plane 10 and the third-base guiding oblique plane 12 are both provided, and apparently, the guiding oblique plane 10 and the third-base guiding oblique plane 12 may also be alternatively provided.

Reference is made to FIG. 13. A central part of the front mounting platform 5 has a hollow portion, that is, the front mounting platform 5 is of a structure having a hollow central part. A central part of the rear mounting platform 7 may also has a hollow portion. Thereby, one or more hollow portions may be provided in the third base 1, which further reduces the weight of the entire device on the premise of ensuring the strength of the third base 1. Apparently, in order to ensure the strength of the first lateral position-limiting stop 2 and the strength of its peripheral structure, it is preferable that the rear mounting platform 7 is not provided with a hollow portion.

The third base 1 may be of a rectangular plate-type structure, and a securing mechanism for securing the third base 1 may be provided on the third base 1. The securing mechanism may include a mounting countersink and a bolt hole arranged in the mounting countersink. The mounting countersink may ensure that a bolt installed in the bolt hole will not be higher than the upper surface of the third base 1, to avoid an interference with an object supported on the third base 1. Two corners, at a right end, of the front mounting platform 5 may be formed as rounded corners 11, which may remove a structural stress, improve the aesthetics of the device and have a weight-reduction effect.

The mounting countersink includes one or more third-base front mounting holes 6 arranged on the front mounting platform 5 and one or more third-base rear mounting holes 8 arranged on the rear mounting platform 6. Preferably, as shown in FIG. 13, the front mounting platform 5 is provided with two third-base front mounting holes 6, the rear mounting platform 6 is provided with one third-base rear mounting hole 8, and in this case, the three mounting holes form a triangular structure or an isosceles triangular structure, which facilitates improving the securing stability of the third base 1.

FIG. 14 shows a schematic view of the structure of the position-limiting securing device in use according to the embodiment of the present application. As shown in FIG. 14, for example, to limit and secure, for example, a pallet 13 (on which a container 14 or other cargos are placed) by the position-limiting securing device, a right end of the pallet 13 enters into the position-limiting securing area surrounded by the upper surface of the third base 1, the first lateral position-limiting stop 2 and the first vertical position-limiting stop 3, thereby achieving the position-limiting and securing of the pallet 13 and the container 14.

Figure 15:
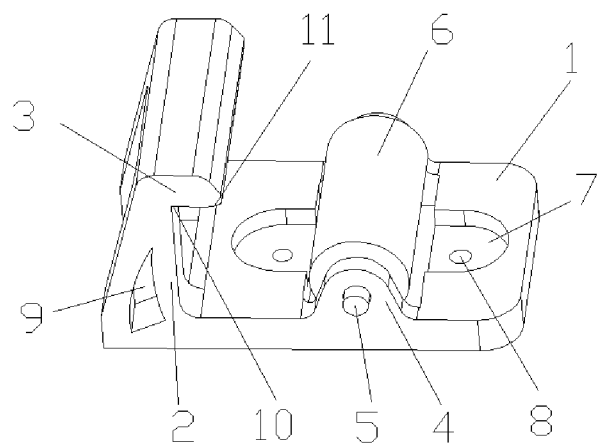
FIG. 15 shows a schematic view of the structure of an end position-limiting mechanism according to an embodiment of the present application.
Figure 16:
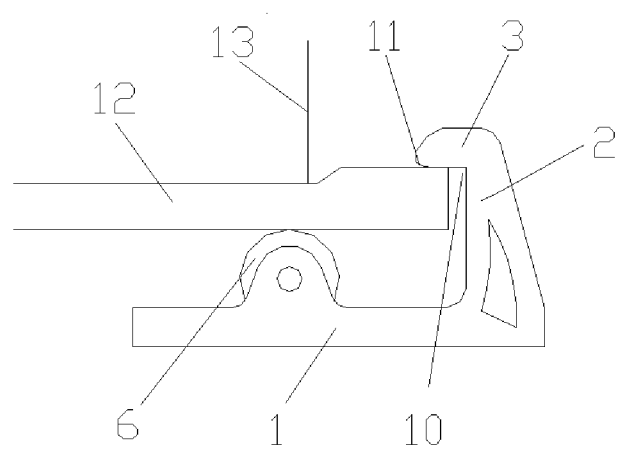
FIG. 16 shows a schematic view of the structure of the end position-limiting mechanism in use according to the embodiment of the present application.

FIG. 15 shows a schematic view of the structure of an end position-limiting mechanism according to an embodiment of the present application, and FIG. 16 shows a schematic view of the structure of the end position-limiting mechanism in use according to the embodiment of the present application.

As shown in FIG. 15, in an embodiment of the present application, the position-limiting securing device includes a fourth base 1, a second longitudinal position-limiting stop 2 and a second vertical position-limiting stop 3. The second longitudinal position-limiting stop 2 is arranged on the fourth base 1 and extends upward in a vertical direction. The second vertical position-limiting stop 3 is arranged on an end, away from the fourth base 1, of the second longitudinal position-limiting stop 2, and extends in a horizontal direction.

Referring to FIG. 15, in other words, a lower end of the second longitudinal position-limiting stop 2 is arranged on the fourth base 1, an upper end of the second longitudinal position-limiting stop 2 is connected to a left end of the second vertical position-limiting stop 3, and a right end of the second vertical position-limiting stop 3 extends rightward in the horizontal direction. The second longitudinal position-limiting stop 2 and the second vertical position-limiting stop 3 may each be embodied as a plate-type structure.

The fourth base 1, the second longitudinal position-limiting stop 2 and the second vertical position-limiting stop 3 may be formed integrally, for example by casting. The fourth base 1, the second longitudinal position-limiting stop 2 and the second vertical position-limiting stop 3 may also be formed separately, and then are connected, for example by welding. Also, a junction, where the second longitudinal position-limiting stop 2 and the second vertical position-limiting stop 3 are connected, forms a second right-angled lock 10. That is, in FIG. 15, a right side surface of the second longitudinal position-limiting stop 2 is perpendicularly connected to a lower surface of the second vertical position-limiting stop 3. The second right-angled lock 10 is formed at the junction of the right side surface of the second longitudinal position-limiting stop 2 and the lower surface of the second vertical position-limiting stop 3.

The position-limiting securing device further includes a rolling auxiliary conveying mechanism. The rolling auxiliary conveying mechanism is provided on an upper surface of the fourth base 1 and is configured to guide an object into the second right-angled lock. As shown in FIG. 15, the rolling auxiliary conveying mechanism may include a pair of lugs 4, a rolling shaft 5 and a roller 6. The rolling shaft 5 passes through a central axis of the roller 6 and the pair of lugs 4, to rotatably arrange the roller 6 between the pair of lugs 4. Preferably, the central axis of the roller 6 may be in parallel with the second longitudinal position-limiting stop 2, to prevent the object from deviating when entering into the second right-angled lock.

Preferably, an outer surface of the roller 6 is in contact with the upper surface of the fourth base 1. The roller 6 may include a roller shell and a bearing. The bearing is sleeved on the rolling shaft 5, and the roller shell covers an outer circumferential surface of the bearing. The bearing is preferably embodied as a friction bearing. With the above structure, in one aspect, the outer surface of the roller 6 is in contact with the upper surface of the fourth base 1, which may avoid the rolling shaft 5 from subjecting all the pressure applied on the roller 6, thus the rolling shaft 5 is not apt to fracture, and the safety and the stability are increased; in another aspect, a pressure exerted downwardly on the rolling member 6 in a vertical direction may be transferred to the fourth base 1 by the contact, and the pressure is also borne by the fourth base 1, thereby, the bearing capacity is improved.

In addition to the above structure, the rolling auxiliary conveying mechanism may further have other structures, for example, a projection and a recessed hole cooperating with each other may be respectively provided on surfaces, corresponding to each other, of the lug 4 and the roller 6, in this way, the roller 6 can also be rotatably arranged between the pair of lugs. In practice, various mechanisms and/or devices may be adopted as long as they can guide an object to enter into and exit from the second right-angled lock in a rolling supporting manner.

As shown in FIG. 15, the position-limiting securing device may further include a reinforcing plate. One end of the reinforcing plate is connected to a base 1, for example connected to a leftmost end of the base 1, and another end of the reinforcing plate is connected to the junction of the second longitudinal position-limiting stop 2 and the second vertical position-limiting stop 3. Thereby, by arranging the reinforcing plate, the strength and bearing capability of the second longitudinal position-limiting stop 2 may be further increased, which allows the entire position-limiting securing device to be safer and more reliable.

Preferably, two of the reinforcing plates are provided, and are respectively located on two ends of the junction of the second longitudinal position-limiting stop 2 and the second vertical position-limiting stop 3, i.e., two ends, in a longitudinal direction, of the junction of the position-limiting stop 2 and the second vertical position-limiting stop 3 in FIG. 15. With this structure, on the premise of ensuring the strength and bearing capability of the second longitudinal position-limiting stop 2, the weight of the entire position-limiting securing device is reduced, thereby meeting the requirements of light weight and energy saving.

As shown in FIG. 15, at the lower end, in the longitudinal direction, of the second longitudinal position-limiting stop 2, a strength optimizing and decorative hole 9 is formed between the reinforcing plate and the second longitudinal position-limiting stop 2. Thereby, a triangular structure is formed by the reinforcing plate, the fourth base 1 and the second longitudinal position-limiting stop 2, which not only facilities increasing the strength of the entire device, but also facilities further reducing the weight of the entire device.

To facilitate guiding an object to be limited and secured into the second right-angled lock described hereinabove, the lower surface of the second longitudinal position-limiting stop 3 is provided with a guiding oblique plane 11. Thereby, when the object moves from a right side to a left side in FIG. 15, due to the presence of the guiding oblique plane 11, a frontmost end, in the moving direction, of the object may easily enter into the second right-angled lock.

As shown in FIG. 15, the fourth base 1 may be a rectangular plate-type structure. The fourth base 1 may be provided with a countersink 7, and the countersink 7 may be provided with one or more fastening holes 8. Arranging the fastening hole 8 in the countersink 7 may ensure that a fastening member, for example a bolt, will be not higher than an upper surface of the fourth base 1 when the fastening member is mounted in the fastening hole 8, thus avoiding an interference with an object supported on the fourth base 1. Two corners, at a right end, of the fourth base 1 may be formed as rounded corners, to remove a structural stress, improve the aesthetics of the device and have a weight-reduction effect.

FIG. 16 shows a schematic view of the structure of the position-limiting securing device with the rolling auxiliary conveying mechanism in use according to the embodiment of the present application. As shown in FIG. 16, to limit and secure, for example, a pallet 12 (on which a container 13 or other cargos are placed) by the position-limiting securing device, a right end of the pallet 12 enters into the second right-angled lock 10 formed by the second longitudinal position-limiting stop 2 and the second vertical position-limiting stop 3, and a position-limiting and securing area is formed by the roller 6 in the rolling auxiliary conveying mechanism and the second right-angled lock 10, to limit and secure an object, for example, by clamping and securing at least a part of the object or at least a part of a carrier of the object, thereby achieving the position-limiting and securing of the pallet 12 and the container 13.

A friction force between the roller 6 and a bottom surface of the pallet 12 is utilized, and the roller 6 cooperates with other track devices arranged in the adjacency, to convey the pallet 12 to the second right-angled lock 10 by rolling of the roller 6. Thus components, such as the roller 6, act as the rolling auxiliary convey device for assisting the pallet 12 in entering into and exiting from the second right-angled lock 10. Thereby, the pallet 12 can enter into the second right-angled lock 10 quickly, conveniently and effortless in the loading process and the unloading process.

A securing system of the freight wagon according to the present application employs a series of technical means including a cargo modularized packaging, a quick loading, rapid conveying and quick securing of cargos, which may achieve the loading, conveying and securing of cargos in the shortest time on the base of ensuing safety and reliability of the transportation, and may significantly increase the transport efficiency of cargos and effectively reduce the cost compared with the conventional loading of cargos. A freight wagon is further provided according to the present application, which includes the above-described securing system for the freight wagon.

The securing system for the freight wagon according to the present application is applicable to common freight transportation, particularly applicable to a freight transportation of the freight motor train unit, and especially applicable for limiting and securing a pallet on which a container or other cargos are placed, thereby achieving a quick loading and unloading of the cargos.

The above descriptions are only preferred embodiments of the present application, and are not deemed to limit the present application. For those skilled in the art, the present application may have various modifications and variations. Any modifications, equivalent replacements and improvements made within the spirit and principle of the present application should fall into the scope of the present application.

What is claimed is:

1. A securing system for a freight wagon, the securing system comprising an entrance area floor and a non-entrance area floor which are located in the freight wagon, wherein a plurality of first rolling mechanisms and a plurality of turn position-limiting mechanisms are provided on the entrance area floor, each of the first rolling mechanisms is configured to allow cargo to move on the entrance area floor in a transverse direction and a longitudinal direction of the freight wagon, each of the turn position-limiting mechanisms is switchable between a position-limiting state and a non-position-limiting state, and is configured to allow the cargo to pass thereabove in the non-position-limiting state, and limit a position of the cargo in the position-limiting state; a plurality of second rolling mechanisms, a plurality of the turn position-limiting mechanisms, a plurality of lateral position-limiting mechanisms and a plurality of end position-limiting mechanisms are provided on the non-entrance area floor, each of the second rolling mechanisms is configured to allow the cargo to move on the non-entrance area floor in the longitudinal direction of the freight wagon, each of the lateral position-limiting mechanisms is configured to limit the position of a lateral side of the cargo, and each of the end position-limiting mechanisms is configured to limit the position of an end of the cargo; and wherein the end position-limiting mechanism is a position-limiting securing device with a rolling auxiliary conveying mechanism, the position-limiting securing device comprises a base, a second longitudinal position-limiting stop and a second vertical position-limiting stop, the second longitudinal position-limiting stop is arranged on the base of the position-limiting securing device and extends upward in a vertical direction, the second vertical position-limiting stop is arranged on an end, away from the base of the position-limiting securing device, of the second longitudinal position-limiting stop and extends in a horizontal direction, a junction, where the second longitudinal position-limiting stop and the second vertical position-limiting stop are connected, forms a right-angled lock of the position-limiting securing device; and the rolling auxiliary conveying mechanism is arranged on an upper surface of the base of the position-limiting securing device and is configured to guide the cargo into the right-angled lock of the position-limiting securing device.

2. The securing system for the freight wagon according to claim 1, wherein the turn position-limiting mechanism comprises a first base, a positioning member, and a position-limiting member rotatably arranged on the first base, the first base comprises a hollow portion; in a case that the turn position-limiting mechanism is in the position-limiting state, the positioning member fixes a position of the position-limiting member, and in a case that the turn position-limiting mechanism is in the non-position-limiting state, the positioning member releases the position-limiting member, and at least a part of the position-limiting member is received in the hollow portion.

3. The securing system for the freight wagon according to claim 2, wherein the position-limiting member comprises a main body portion and a position-limiting portion, the main body portion comprises a first section and a second section, the first section has a first end rotatably arranged on the first base and a second end connected to a first end of the second section, a second end of the second section is connected to the position-limiting portion; the second section is a straight section, and the straight section and the position-limiting portion form a T-shaped structure.

4. The securing system for the freight wagon according to claim 3, wherein the turn position-limiting mechanism further comprises a first elastic member, and the first elastic member is configured to allow the position-limiting member to have a tendency of turning toward the hollow portion.

5. The securing system for the freight wagon according to claim 4, wherein the positioning member comprises a first positioning member, a first end of the first positioning member is rotatably arranged on the first base and a second end of the first positioning member is a hook-shaped structure, the first section has a hollow portion, the hook-shaped structure is configured to pass through the hollow portion and hook a first side of the first section in the case that the turn position-limiting mechanism is in the position-limiting state.

6. The securing system for the freight wagon according to claim 5, wherein the turn position-limiting mechanism further comprises a second elastic member, and the second elastic member is configured to allow the second end of the first positioning member to have a tendency of moving upward with respect to the first base.

7. The securing system in the freight wagon according to claim 6, wherein the turn position-limiting mechanism further comprises a pedal, the pedal is arranged on the first positioning member, and is configured to allow the second end of the first positioning member to move downward with respect to the first base under the action of an external force.

8. The securing system for the freight wagon according to claim 7, wherein the positioning member comprises a second positioning member, a first end of the second positioning member is fixedly arranged on the first base, and a second end of the second positioning member is configured to abut against a second side of the first section in the case that the turn position-limiting mechanism is in the position-limiting state; and the first side and the second side are two opposite sides of the first section.

9. The securing system for the freight wagon according to claim 1, wherein the first rolling mechanism is a universal ball.

10. The securing system for the freight wagon according to claim 1, wherein the second rolling mechanism comprises a base and a pair of lugs arranged on the base of the second rolling mechanism, and further comprises a rolling member and a rotating shaft, the rolling member is supported on the pair of lugs by the rotating shaft, and is rotatable with respect to the base of the second rolling mechanism, and an outer surface of the rolling member is in contact with an upper surface of the base of the second rolling mechanism.

11. The securing system for the freight wagon according to claim 10, wherein the rolling member comprises a roller shell and a bearing, the bearing is sleeved on the rotating shaft, and the roller shell covers an outer circumferential surface of the bearing.

12. The securing system for the freight wagon according to claim 1, wherein the lateral position-limiting mechanism comprises a base, a first lateral position-limiting stop and a first vertical position-limiting stop, the first lateral position-limiting stop is arranged on the base of the lateral position-limiting mechanism and extends upward in a vertical direction, the first vertical position-limiting stop is arranged on an end, away from the base of the lateral position-limiting mechanism, of the first lateral position-limiting stop and extends in a horizontal direction; a junction, where the first lateral position-limiting stop and the first vertical position-limiting stop are connected, forms a first right-angled lock; and an upper surface of the base of the lateral position-limiting mechanism, the first lateral position-limiting stop and the first vertical position-limiting stop together form a position-limiting securing area for limiting the position of the cargo.

13. The securing system for the freight wagon according to claim 12, wherein the base of the lateral position-limiting mechanism comprises a front mounting platform and a rear mounting platform, and the first lateral position-limiting stop is arranged at a junction where the front mounting platform and the rear mounting platform are connected.

14. The securing system for the freight wagon according to claim 13, wherein the lateral position-limiting mechanism further comprises a reinforcing plate, the reinforcing plate has one end connected to the rear mounting platform and another end connected to the junction of the first lateral position-limiting stop and the first vertical position-limiting stop.

15. The securing system for the freight wagon according to claim 1, wherein the rolling auxiliary conveying mechanism comprises a roller and a pair of lugs, the roller is rotatably arranged between the pair of lugs, and a central axis of the roller is in parallel with the second longitudinal position-limiting stop.

16. The securing system for the freight wagon according to claim 15, wherein the rolling auxiliary conveying mechanism further comprises a rolling shaft, the rolling shaft passes through the central axis of the roller and the pair of lugs, and an outer surface of the roller is in contact with the upper surface of the base of the position-limiting securing device.

17. The securing system for the freight wagon according to claim 16, wherein the roller comprises a roller shell and a bearing, the bearing is sleeved on the rolling shaft, and the roller shell covers an outer circumferential surface of the bearing.

18. A freight wagon, comprising the securing system for the freight wagon according to claim 1.

* * * * *